Figure 1:
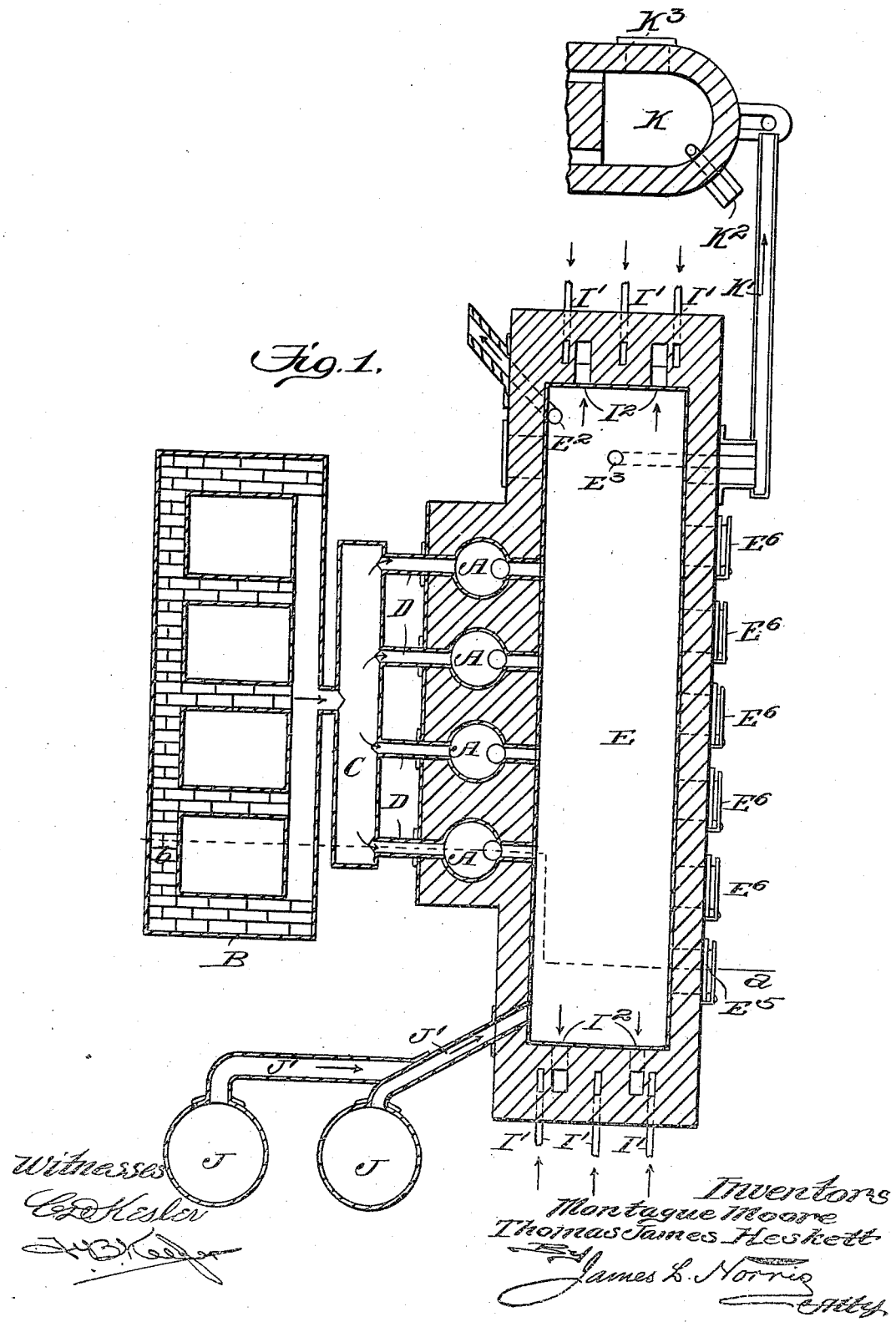

M. MOORE & T. J. HESKETT.
METALLURGICAL APPARATUS.
APPLICATION FILED APR. 17, 1908.

960,988.

Patented June 7, 1910.

2 SHEETS—SHEET 2.

UNITED STATES PATENT OFFICE.

MONTAGUE MOORE, OF MELBOURNE, AND THOMAS JAMES HESKETT, OF BRUNSWICK, VICTORIA, AUSTRALIA.

METALLURGICAL APPARATUS.

960,988.  Specification of Letters Patent.  Patented June 7, 1910.

Application filed April 17, 1908. Serial No. 427,756.

*To all whom it may concern:*

Be it known that we, MONTAGUE MOORE and THOMAS JAMES HESKETT, subjects of the King of Great Britain, residing at No. 314 Collins street, Melbourne, in the State of Victoria and Commonwealth of Australia, and No. 2 Donald street, Brunswick, in the said State, respectively, have invented certain new and useful Improvements in Metallurgical Apparatus, of which the following is a specification.

This invention relates to certain improvements on what is known as the Moore-Heskett apparatus for treating ferruginous ore for the manufacture of iron and steel therefrom. That apparatus was designed in order to carry into effect a process according to which the ore was first ground or crushed to a fine state of division, the silica earthy or other deleterious matter being concentrated and separated therefrom. The ore was subjected while passing through a chamber to heat, preferably produced by the admixture of air with waste carbonic oxid or hydro-carbon gas issuing from another chamber, and then to the progressive reducing action of such gas or gases alone while passing through said latter chamber, and was then passed without coming in contact with an oxidizing atmosphere into a Siemens or other gas furnace where it was fused and "balled up" as wrought iron or converted into steel. The apparatus used in carrying out the said process consisted essentially either of a vertical tower, which practically constituted two chambers, a revolving cylinder and a vertical tower, or two revolving cylinders, and a Siemens gas furnace in communication with the bottom of the tower or the second and lowermost of the two revolving cylinders. The gases used for both heating and reducing passed either upward in the opposite direction to the ore being treated, or the gas for heating passed upward and the reducing gas downward. In the latter case the reduced ore was delivered to the gas furnace and beneath a bath of molten metal therein, while enveloped or protected from oxidation by the reducing gas which is fed in with it, but we find that said reducing gas by the time it reached the entrance to the gas furnace had become so deteriorated by the admixture therewith of oxygen given off from the ore that the best results were not obtained.

Now in order to obviate the said deterioration of the reducing gas we have invented certain improvements in the process which improvements form the subject of an application for Letters Patent filed contemporaneously herewith. According to the said improvements the reducing gas enters the reducing chamber at the bottom and is so controlled that a portion of it passes upward and through the reducing chamber, reducing the ore therein to metal, and is subsequently in another chamber, consumed by the admixture of air therewith, to supply the necessary heat for heating fresh supplies of ore. The remaining portion passes with the reduced ore from the reducing chamber to the gas furnace and protects said ore from oxidation until it is delivered beneath a bath of slag in said furnace where it is "balled up" into wrought iron, and subsequently taken out through the doors to a squeezer or hammer and treated in the ordinary way for the production of wrought iron bars &c. The waste gases from the gas furnace pass upward to an air regenerator to heat the air passing therethrough to the gas furnace.

To make and maintain the bath of slag in the gas furnace and to melt any silicious or earthy materials adhering to the ore, fluxes may be supplied through the door of the gas furnace, or may be delivered with the ore from the reducing chamber.

When steel is to be manufactured scrap steel or wrought iron is melted with solid fuel in a cupola furnace, by which means it becomes highly carburized, and is fed into the gas furnace into which the reduced iron falls. A high temperature is maintained in the furnace, and consequently the reduced iron is speedily melted, and when the bath is full of metal in a state of fluidity the whole or part of the metal is tapped out or run into a refining furnace. The bath of metal in the refining furnace contains a minimum of slag and alloyed carbon and in said refining furnace can be quickly refined and treated in the ordinary way to obtain a metal of exact quality and without interfering with the continuous melting of the reduced iron in the gas furnace. Any required alloys are added to the metal and the bath may be of an acid or basic character to suit the metal under treatment. When ready, the metal is poured into ingot molds in the usual way.

In carrying out the process above described we provide an inlet for the reducing gas at the bottom of the reducing chamber, an air inlet at the bottom of the heating chamber, and a damper at the top of the latter chamber. By means of said damper the volume of gas entering near the bottom of said reducing chamber can be so controlled as that a portion thereof will pass through said reducing chamber while the remainder will pass with the reduced metal to the gas furnace. In cases where a tower is used for heating and reducing the iron ore, or in conjunction with a revolving cylinder for the same purposes, we prefer to construct said tower in the same way as an ordinary Siemens regenerator whereby the ore in its passage through or down it, is compelled to follow a circuitous course thus keeping it under treatment for a longer period. Where two revolving cylinders or one cylinder in conjunction with a tower is used, we may, if desired, insert in said cylinder or cylinders a series of small cylinders through which the ore is passed, thus effecting a more intimate contact between the ore and gases.

In communication with the gas furnace into which the reduced metallic iron is continuously fed are one or more cupola melting furnaces, in which scrap steel or wrought iron can be melted with solid fuel and poured into the bath of the gas furnace when required. A launder leads from said gas furnace to another gas furnace constituting a refining furnace and through this launder the metal runs into said refining furnace. If preferred, the metal can be tapped into the refining furnace as required. As has been before explained, the cupola furnaces and also the refining furnace are not used when making wrought iron, they only being necessary in the manufacture of steel, but if it is required to make a more or less steely quality of wrought iron, the highly carburized metal in the cupola furnace may be run into the gas melting furnace. A lower temperature in that case is maintained in the furnace so that the reduced iron does not melt but is "balled up" in the usual way for wrought iron, in a bath of carburized iron and slag.

In cases where ore rich in iron is procurable and concentration is therefore not necessary we treat it in lump form thus avoiding the expense of crushing to a fine state of division. When lump ore is treated the heating and reducing chambers are not provided with means to delay the passage of the ore as in the case of ore in a fine state of division. The heating and reducing chambers are simply filled with the ore to be treated, and the bottom of the reducing chamber is slightly altered in construction so that the ore remains at rest, say upon a shelf, until it is either drawn forward by hand into the bath or pushed forward by mechanical means.

Figure 2:
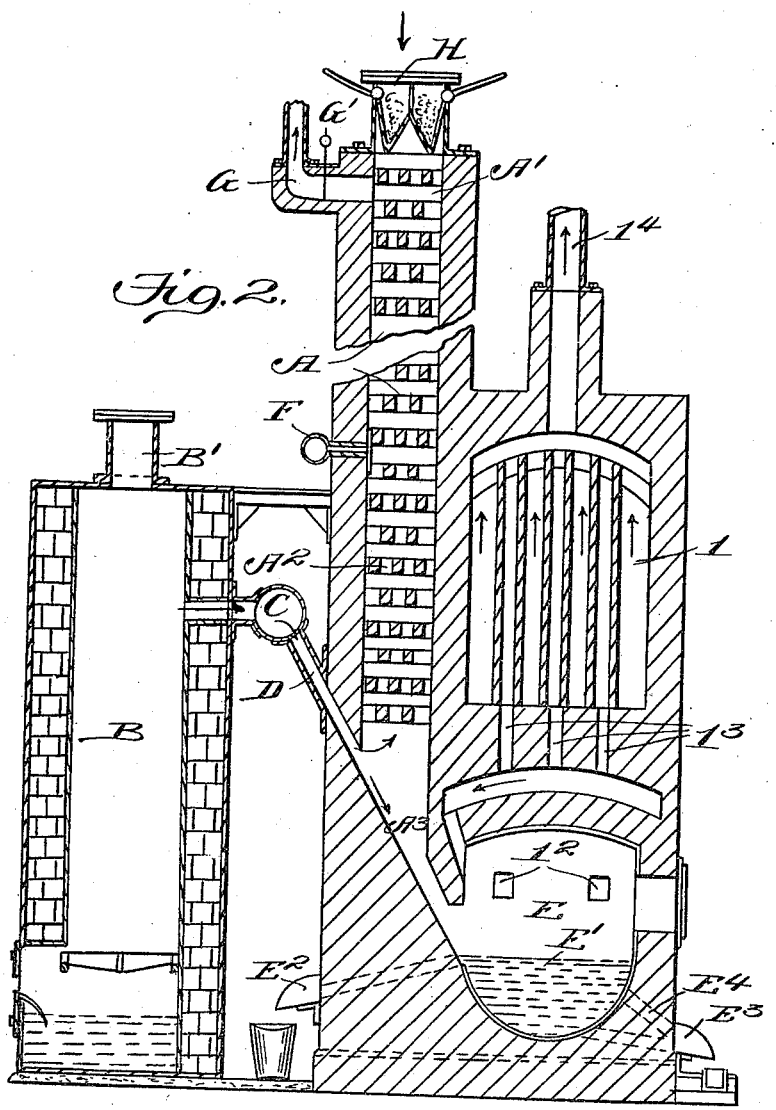

Referring to the drawings hereto annexed Figure 1 is a plan in section of our complete apparatus while Fig. 2 is a sectional elevation on line $a\ b$ Fig. 1.

A A A A are the heating and reducing chambers which as shown consist of vertical towers, but as previously explained, said heating and reducing chambers may each consist of a vertical tower and a revolving cylinder set at an angle to and in communication with said tower, or two revolving cylinders in communication with each other, the one constituting the reducing chamber being at a lower elevation than the other or heating chamber. The upper portion $A^1$ of each of the towers A constitutes the heating chamber and the lower portion $A^2$ the reducing chamber. The interior of all these vertical towers may be constructed as shown in Fig. 2 in the same way as an ordinary Siemens regenerator and when so constructed are intended for treating ore in a fine state of division. By so constructing said towers the ore under treatment is compelled to follow a circuitous course and its passage through the towers is considerably delayed so as to give the gases sufficient time to act on the ore. If the towers are intended for treating lump ore the internal construction constituting a series of passages is dispensed with.

B is a gas producer and $B^1$ a feeding door thereto. C is a flue in communication with said gas producer B, and from which flue C the gas flows through pipes D lined with fire resisting material to the bottom of the reducing chamber $A^2$ of each tower A.

$A^3$ is a passage through which the reduced ore passes to the gas furnace E.

F is an air inlet to the heating chamber $A^1$ of the tower A.

G is a flue for the escape of waste gas from the top of the heating chamber $A^1$, and $G^1$, is a damper in said flue G by operating which the gas supplied to the bottom of the reducing chamber $A^2$ may be so manipulated as that portion of it passes upward through the reducing and heating chambers $A^1$ and $A^2$, while the remainder passes downward with the reduced ore from reducing chamber $A^2$ through passage $A^3$ leading from the bottom of each reducing chamber to the gas furnace E.

H is a hopper through which the ore to be treated is fed to the top of the heating chamber $A^1$.

$E^1$ is a metal bath in the gas furnace E.

$E^2$ is a slag hole and $E^4$ is a metal tapping hole in said furnace E, through which a portion of the metal can be tapped off as it accumulates. $E^3$ is another tapping hole through which the remainder of the metal can be tapped off when desired to empty the furnace.

I is an air regenerator. $I^1$ are cold air inlets to said air regenerator.

$I^2$ are waste heat flues leading from the gas furnace E to the air regenerator I.

$I^3$ are hot air passages leading from the air regenerator I to the gas furnace E.

$I^4$ is a waste heat flue at the top of the regenerator I.

J are cupola furnaces and $J^1$ are launders through which the fluid highly carburized metal passes from said cupola furnaces into the bath in the gas furnace E.

$E^5$ is the flux-charging door to furnace E and $E^6$ are the working doors of said furnace.

K is a refining furnace and $K^1$ a launder leading from metal tapping holes $E^3$ and $E^4$ to said refining furnace K. $K^2$ is a metal tapping hole in said refining furnace and $K^3$ a feeding door for fuel thereto.

By our apparatus a continuous melting and refining of the ore can be carried on.

What we claim as our invention, and desire to secure by Letters Patent, is:—

1. In an apparatus of the class described, the combination of a furnace to contain a bath of molten metal, an ore reducing chamber connected therewith, and a cupola furnace also connected to deliver molten metal to the furnace first mentioned.

2. An apparatus of the class described comprising a gas furnace, heating and reducing chambers, the former having an outlet in its upper portion and the latter having an opening in its lower portion to receive air and to discharge reduced metal into the furnace, a gas producer, means for conducting gas from the producer into the lower portion of the reducing chamber and into the furnace, an air inlet arranged in the lower portion of the heating chamber, and a damper in the outlet of the heating chamber for regulating the amount of gas supplied to the heating and reducing chambers.

3. In an apparatus of the class described, the combination of a furnace to contain a bath of molten metal, ore heating and reducing chambers adapted to discharge reduced metal therein, a cupola furnace also connected to deliver molten metal into the furnace first mentioned, and a refining furnace connected to receive metal from the furnace first mentioned.

In testimony whereof we have hereunto set our hands in presence of two subscribing witnesses.

MONTAGUE MOORE.
THOMAS JAMES HESKETT.

Witnesses:
WALTER S. BAYSTON,
FRANK BAYSTON.